United States Patent
Kinoshita et al.

(10) Patent No.: US 9,300,061 B2
(45) Date of Patent: Mar. 29, 2016

(54) BATTERY WIRING MODULE (75) Inventors: Yuko Kinoshita, Yokkaichi (JP);
Hiroomi Hiramitsu, Yokkaichi (JP);
Hiroki Hirai, Yokkaichi (JP); Katsunori
Hamana, Yokkaichi (JP); Tomofumi
Tsuji, Yokkaichi (JP); Mitsuhiro
Akasaka, Yokkaichi (JP); Tetsuya
Nakagawa, Yokkaichi (JP); Yoshinao
Kobayashi, Yokkaichi (JP); Masaru
Shitamichi, Yokkaichi (JP); Daiki
Hirano, Osaka (JP)

(73) Assignees: AUTONETWORKS
TECHNOLOGIES, LTD., Mie (JP);
SUMITOMO WIRING SYSTEMS,
LTD., Mie (JP); SUMITOMO
ELECTRIC INDUSTRIES, LTD.,
Osaka (JP)

( * ) Notice: Subject to any disclaimer, the term of this patent is extended or adjusted under 35 U.S.C. 154(b) by 57 days.

(21) Appl. No.: 14/126,288
(22) PCT Filed: Jun. 15, 2012
(86) PCT No.: PCT/JP2012/065338
§ 371 (c)(1),
(2), (4) Date: Dec. 13, 2013
(87) PCT Pub. No.: WO2013/005557
PCT Pub. Date: Jan. 10, 2013

(65) Prior Publication Data
US 2014/0113494 A1    Apr. 24, 2014

(30) Foreign Application Priority Data

Jul. 7, 2011   (JP) ................... 2011-150901
Feb. 8, 2012   (JP) ................... 2012-025034
Feb. 14, 2012  (JP) ................... 2012-029694

(51) Int. Cl.
H01R 24/00    (2011.01)
H01R 11/11    (2006.01)
(Continued)

(52) U.S. Cl.
CPC ............. *H01R 11/11* (2013.01); *H01M 2/1061* (2013.01); *H01M 2/1077* (2013.01); *H01M 2/202* (2013.01); *H01R 24/00* (2013.01)

(58) Field of Classification Search
CPC .. H01R 11/11; H01M 2/1077; H01M 2/1061; H01M 2/202
USPC .............. 439/627, 500, 397–400; 429/65, 90; 324/426, 429, 433, 434
See application file for complete search history.

(56) References Cited

U.S. PATENT DOCUMENTS 6,010,375 A *  1/2000  Higuchi ..................... 439/763
6,152,776 A    11/2000  Ikeda et al.
(Continued)

FOREIGN PATENT DOCUMENTS

CN    1767245 A    5/2006
EP    1054461 A2   11/2000
(Continued)

OTHER PUBLICATIONS

Nov. 17, 2014 Search Report issued in European Patent Application No. 12808087.6.
(Continued)

*Primary Examiner* — Abdullah Riyami
*Assistant Examiner* — Harshad Patel
(74) *Attorney, Agent, or Firm* — Oliff PLC (57) ABSTRACT A battery wiring module is configured to be attached to a battery group including a plurality of batteries each having electrode terminals including a positive electrode terminal and a negative electrode terminal and configured to connect the electrode terminals. The battery wiring module includes a plurality of connection units connected to each other in a battery arrangement direction in which the batteries are arranged. Each of the connection units includes a bus bar and a bus bar housing. The bus bar is configured to connect one of the electrode terminals of one of the batteries and one of the electrode terminals of another one of the batteries. The bus bar housing houses the bus bar. The bus bar has a pair of terminal through holes configured to receive the electrode terminals and each of the terminal through holes is formed in a shape elongated in the battery arrangement direction.

5 Claims, 11 Drawing Sheets (51) Int. Cl.
*H01M 2/10* (2006.01)
*H01M 2/20* (2006.01)

(56) References Cited

U.S. PATENT DOCUMENTS

| | | | |
|---|---|---|---|
| 6,290,552 B1 | 9/2001 | Saito et al. | |
| 6,881,100 B2 * | 4/2005 | Barry et al. | 439/701 |
| 7,556,533 B2 | 7/2009 | Seo | |
| 8,388,382 B2 * | 3/2013 | Ikeda et al. | 439/627 |
| 8,822,062 B2 | 9/2014 | Ikeda et al. | |
| 2001/0039150 A1 | 11/2001 | Saito et al. | |
| 2001/0044241 A1 | 11/2001 | Saito et al. | |
| 2001/0046816 A1 | 11/2001 | Saito et al. | |
| 2006/0091855 A1 | 5/2006 | Seo | |
| 2006/0246781 A1 | 11/2006 | Yoon et al. | |
| 2010/0271223 A1 | 10/2010 | Ohkura et al. | |
| 2011/0045329 A1 | 2/2011 | Ikeda et al. | |
| 2011/0064986 A1 | 3/2011 | Ogasawara et al. | |
| 2011/0223466 A1 | 9/2011 | Lee et al. | |
| 2012/0015550 A1 | 1/2012 | Ikeda et al. | |

FOREIGN PATENT DOCUMENTS

| | | |
|---|---|---|
| GB | 2330252 A | 4/1999 |
| JP | 57-015078 U | 1/1982 |
| JP | A 11-120987 | 4/1999 |
| JP | A 2006-128116 | 5/2006 |
| JP | A 2010-3585 | 1/2010 |
| JP | 2010-225449 A | 10/2010 |
| JP | 2010-257775 A | 11/2010 |
| JP | A 2011-8957 | 1/2011 |
| JP | 2011-040335 A | 2/2011 |
| JP | A 2011-67012 | 3/2011 |
| JP | 2011-124176 A | 6/2011 |
| JP | A 2011-233491 | 11/2011 |
| JP | 2012-198995 A | 10/2012 |
| WO | 2006112628 A1 | 10/2006 |
| WO | 2010071292 A1 | 6/2010 |
| WO | 2011021614 A1 | 2/2011 |
| WO | WO 2011/021614 * | 2/2011 |

OTHER PUBLICATIONS

Aug. 14, 2012 Search Report issued in International Patent Application No. PCT/JP2012/065338 (with translation).
Aug. 14, 2012 Written Opinion issued in International Patent Application No. PCT/JP2012/065338 (with partial translation).
May 28, 2015 Office Action issued in Chinese Application No. 201280033488.7.
May 21, 2015 Office Action issued in Japanese Application No. 2012-029694.
May 21, 2015 Office Action issued in Japanese Application No. 2012-025034.
Jan. 4, 2016 Office Action issued in Chinese Patent Application No. 201280033488.7.
Jan. 7, 2016 Office Action issued in Japanese Patent Application No. 2012-029694.
Jan. 7, 2016 Office Action issued in Japanese Patent Application No. 2012-025034.

* cited by examiner

BATTERY WIRING MODULE

TECHNICAL FIELD

The present invention relates to a battery wiring module to be attached to a battery group.

BACKGROUND ART

A battery wiring module configured to connect a plurality of batteries is disclosed in Patent Document 1. The battery wiring module includes a plurality of bus bars and a plate made of synthetic resin. The bus bars are provided to the synthetic resin plate and configured to connect electrode terminals of the adjacent batteries. The battery wiring module is assembled to a battery group in which the batteries are arranged adjacent to each other and the electrode terminals of the batteries are connected by the bus bars. The battery wiring module is assembled to the batteries and a battery module is thus obtained. Such a battery module is used as a power source of an electric vehicle and a hybrid vehicle.

RELATED ART DOCUMENT

Patent Document

[Patent Document 1] Japanese Unexamined Patent Publication No. 11-120987

According to the above configuration, the battery wiring module is formed as a single synthetic resin plate and thus the battery wiring module is less likely to be curved as a whole. Therefore, in assembling the battery wiring module to the battery group, each bus bar is not connected independently to each electrode terminal by bending the battery wiring module with respect to an assembling direction in which the battery wiring module is assembled to the electrode terminals. In other words, all of the bus bars are connected to all of the electrode terminals at the same time in a battery wiring module of the related art.

However, deviations of the pitch between the electrode terminals may be caused by a manufacturing tolerance of each battery or an assembling tolerance of the arranged batteries. Therefore, in the conventional technology, a slit is formed in a synthetic resin plate that configures a battery wiring module and a size of such a slit may be increased or decreased to absorb the deviation of the pitch between the electrode terminals.

An operation of connecting the above battery wiring module of the conventional technology to a battery group will be explained. First, the battery wiring module is set above the electrode terminals of the battery group and the deviation of the pitch between the electrode terminals is adjusted by increasing or reducing a size of the slit. Then, the entire battery wiring module is moved down and all of the bus bars are connected to all of the electrode terminals at the same time.

In assembling the battery wiring module of the conventional technology, each slit is required to be increased or reduced in its size corresponding to each deviation of the pitch between the electrode terminals. Further, a relatively great force is required to increase or reduce a size of the slit formed in the synthetic resin plate.

Further, as described above, the battery wiring module is less likely to be curved as a whole. Therefore, if the deviation of the pitch between the electrode terminals is not absorbed only one portion and the deviations of the pitch are absorbed other portions, the battery wiring module is not assembled to the battery group.

Therefore, there is a need in the art to provide a battery wiring module that absorbs a deviation of the pitch between electrode terminals and has improved assembling workability to a battery group.

SUMMARY

A battery wiring module according to the present invention is configured to be attached to a battery group including a plurality of batteries each having electrode terminals including a positive electrode terminal and a negative electrode terminal and configured to connect the electrode terminals. The battery wiring module includes a plurality of connection units connected to each other in a battery arrangement direction in which the batteries are arranged. Each of the connection units includes a bus bar and a bus bar housing. The bus bar is configured to connect one of the electrode terminals of one of the batteries and one of the electrode terminals of another one of the batteries. The bus bar housing is configured to house the bus bar. The bus bar has a pair of terminal through holes through which the electrode terminals are inserted and each of the terminal through holes is formed in a shape so as to elongate in the battery arrangement direction.

According to the present invention, the battery wiring module includes the plurality of connection units. With this configuration, the electric wiring module is more likely to be curved as a whole and thus each bus bar housed in each connection unit can be connected to each electrode terminal by bending the battery wiring module as a whole. This improves workability of assembling the battery wiring module to the batteries.

Each of the pair of the terminal through holes formed in the bus bar has an elongated shape in the battery arrangement direction. Therefore, the deviation of the pitch between the electrode terminals can be absorbed by the terminal through holes.

According to the present invention, in a battery wiring module, a deviation of the pitch between electrode terminals is absorbed and assembling workability to a battery group is improved.

BEST MODE FOR CARRYING OUT THE INVENTION

<First Embodiment>

An embodiment of the present invention will be described with reference to FIG. 1 to FIG. 11. In this embodiment, the present invention is applied to a battery module 10. The battery module 10 of the present embodiment is mounted to a vehicle such as an electric vehicle or a hybrid vehicle (not illustrated) and used as an power source that drives the vehicle. The battery module 10 includes a battery group 13 and the battery group 13 includes a plurality of batteries 12 each of which has electrode terminals 11. The electrode terminals 11 are electrically connected to each other by a battery connecting module 14.

Figure 1:
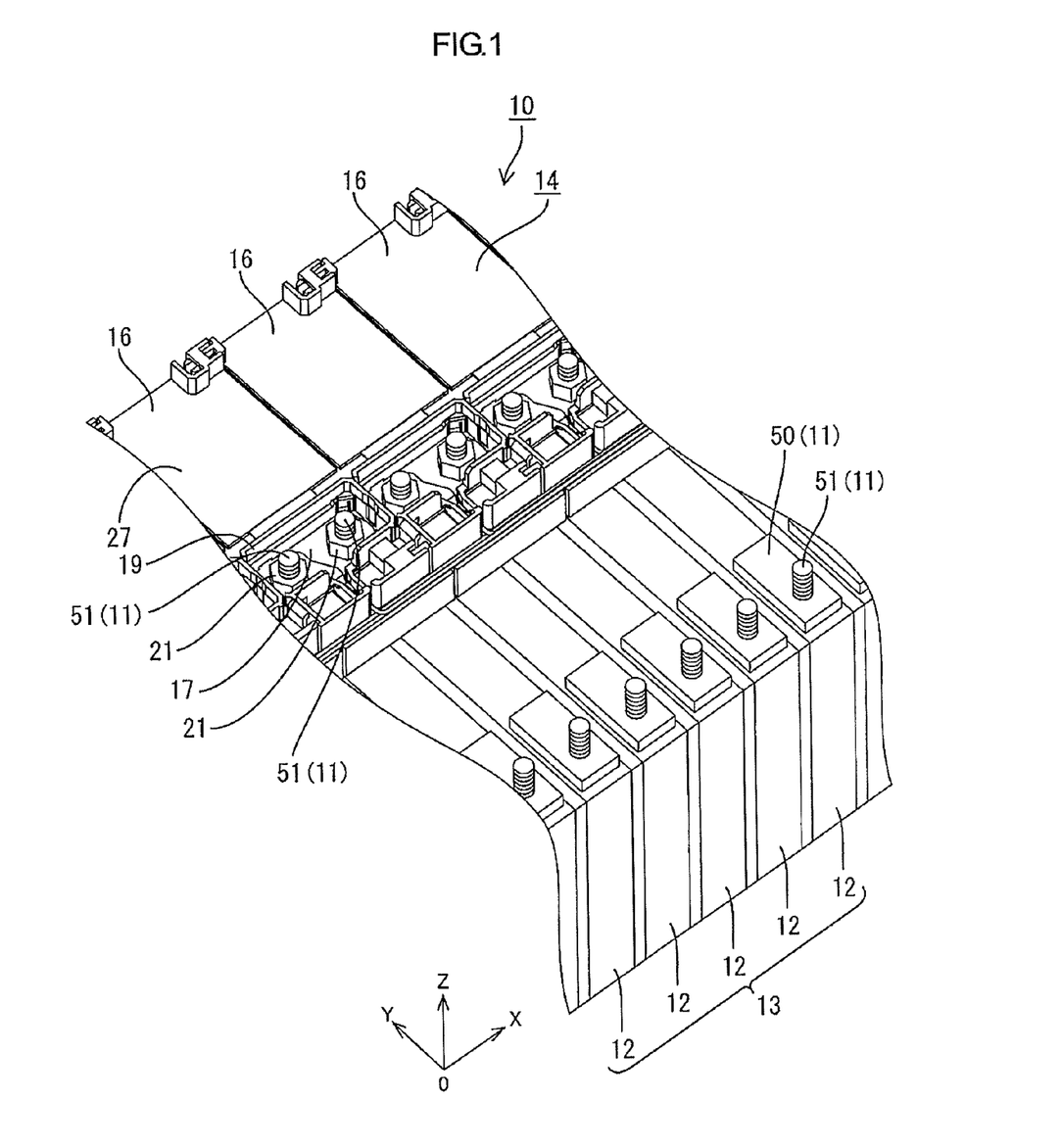
FIG. 1 is a magnified perspective view illustrating a part of a battery module according to an embodiment of the present invention

In the following description, an X side of an arrow OX in FIG. 1 is a right side and an O side thereof is a left side. A Y side of an arrow OY in FIG. 1 is a rear side and an O side thereof is a front side. A Z side of an arrow OZ in FIG. 1 is an upper side and an O side thereof is a lower side.

In the following description, a reference number may be applied to one in the same component and may not be applied to the others in the same component.

(Battery 12)

The battery 12 is formed in a substantially flat rectangular parallelepiped. The battery 12 houses a power generating element (not illustrated) therein. A pair of electrode terminals 11 is formed on an upper surface of the battery 12 so as to project upwardly. The two electrode terminals 11 are provided adjacent to end portions of the upper surface of the battery 12 in the front-rear direction, respectively. One of the electrode terminals 11 is a positive electrode terminal and another one is a negative electrode terminal. The electrode terminal 11 configuring the positive electrode terminal and the electrode terminal 11 configuring the negative electrode terminal have the same shape and size. Each electrode terminal 11 includes a terminal base 50 and an electrode post 51. The terminal base 50 is made of metal and projects upwardly from an upper surface of the battery 12. The electrode post 51 projects upwardly from the terminal base 50. The terminal base 50 has an elongate rectangular shape in the front-rear direction viewed from the above. A screw thread is formed on an outer surface of the electrode post 51. The batteries 12 are arranged such that the adjacent electrode terminals 11 have different poles. The batteries 12 are arranged in the right-left direction to configure the battery group 13.

(Battery Wiring Module 14)

The battery wiring module 14 is attached to the upper surface of the battery group 13. In FIG. 1, the electrode terminals 11 located on a rear side of the battery group 13 are electrically connected to each other by the battery wiring module 14. The battery wiring module 14 that is connected to the electrode terminals 11 located on a front side of the battery group 13 is not described.

Figure 2:
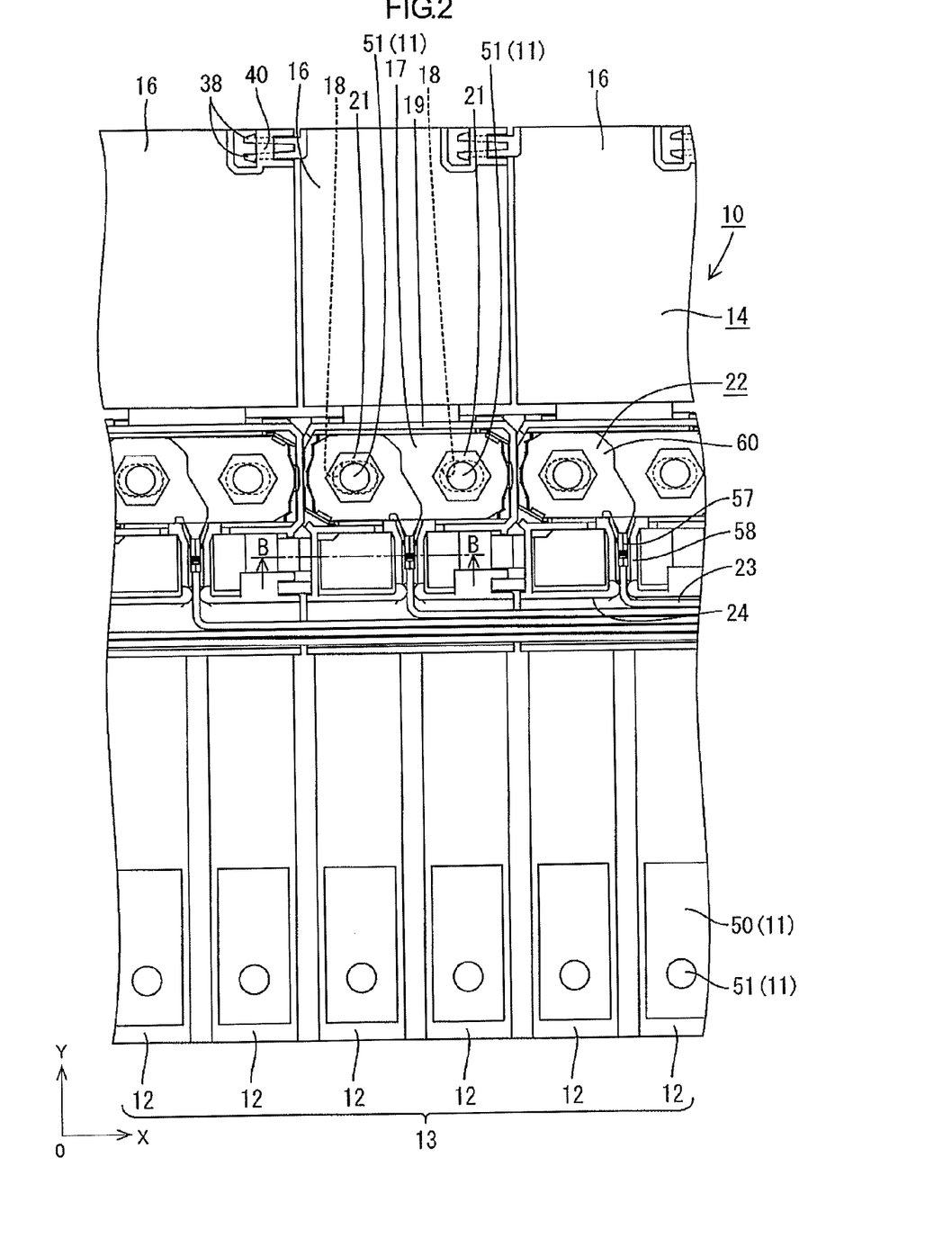
FIG. 2 is a magnified plan view illustrating a part of the battery module.

As illustrated in FIG. 2, the battery module 14 includes a plurality of connection units 16 that are connected to each other in the right-left direction. The connection units 16 are arranged in a direction that matches an arrangement direction in which the batteries 12 of the battery group 13 are arranged.

(Connection Unit 16)

Each connection unit 16 includes a bus bar 17. The bus bar 17 connects the electrode terminal 11 of one of the batteries 12 and the electrode terminal 11 of another battery 12 adjacent to the one of the batteries 12. The bus bar 17 is made of a metal plate such as copper, copper alloy, or steel use stainless (SUS) and formed in a predetermined shape by pressing. Specifically, the bus bar 17 has an elongated shape in the right-left direction viewed from the above. The bus bar 17 has a pair of terminal through holes 18 through which the electrode posts 51 of the electrode terminals 11 are inserted.

The connection unit 16 has a bus bar housing 19 made of synthetic resin and houses the bus bar 17 therein. The bus bar housing 19 is formed in a substantially rectangular shape viewed from the above and in a shape greater than that of the bus bar 17. The bus bar housing 19 has an opening 20 that is open upwardly and the bus bar 17 is housed in the bus bar housing 19 through the opening 20.

Each electrode post 51 is inserted through the terminal through hole 18 of the bus bar 17 and a nut 21 is screwed to the electrode post 51. The bus bar 17 is sandwiched between the nut 21 and the terminal base 50 and thus the electrode terminal 11 is electrically connected to the bus bar 17.

As illustrated in FIG. 2, each terminal through hole 18 is formed in an elongated shape in the battery arrangement direction of the batteries 12 (the right-left direction in FIG. 2).

Figure 3:
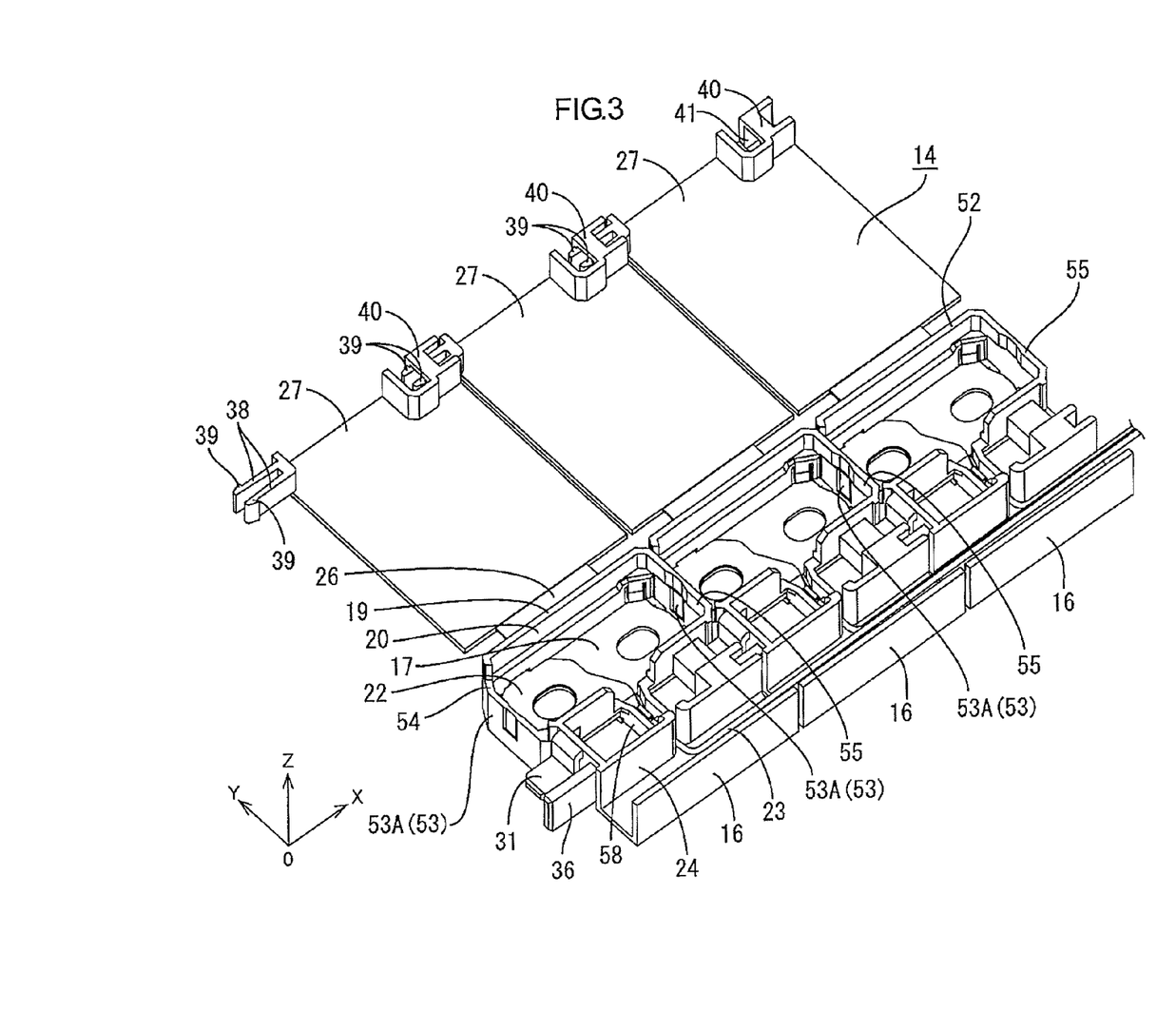
FIG. 3 is a magnified perspective view illustrating a part of a battery wiring module.

As illustrated in FIG. 3, the bus bar housing 19 has insulation walls 52 (four insulation walls in this embodiment) that surround an edge portion of the bus bar 17. In the four insulation walls 52, a pair of the insulation walls 52 that is perpendicular to a battery arrangement direction in which the batteries 12 are arranged (a direction indicated by an arrow OX in FIG. 3) is defined as a pair of side walls 53.

Figure 7:
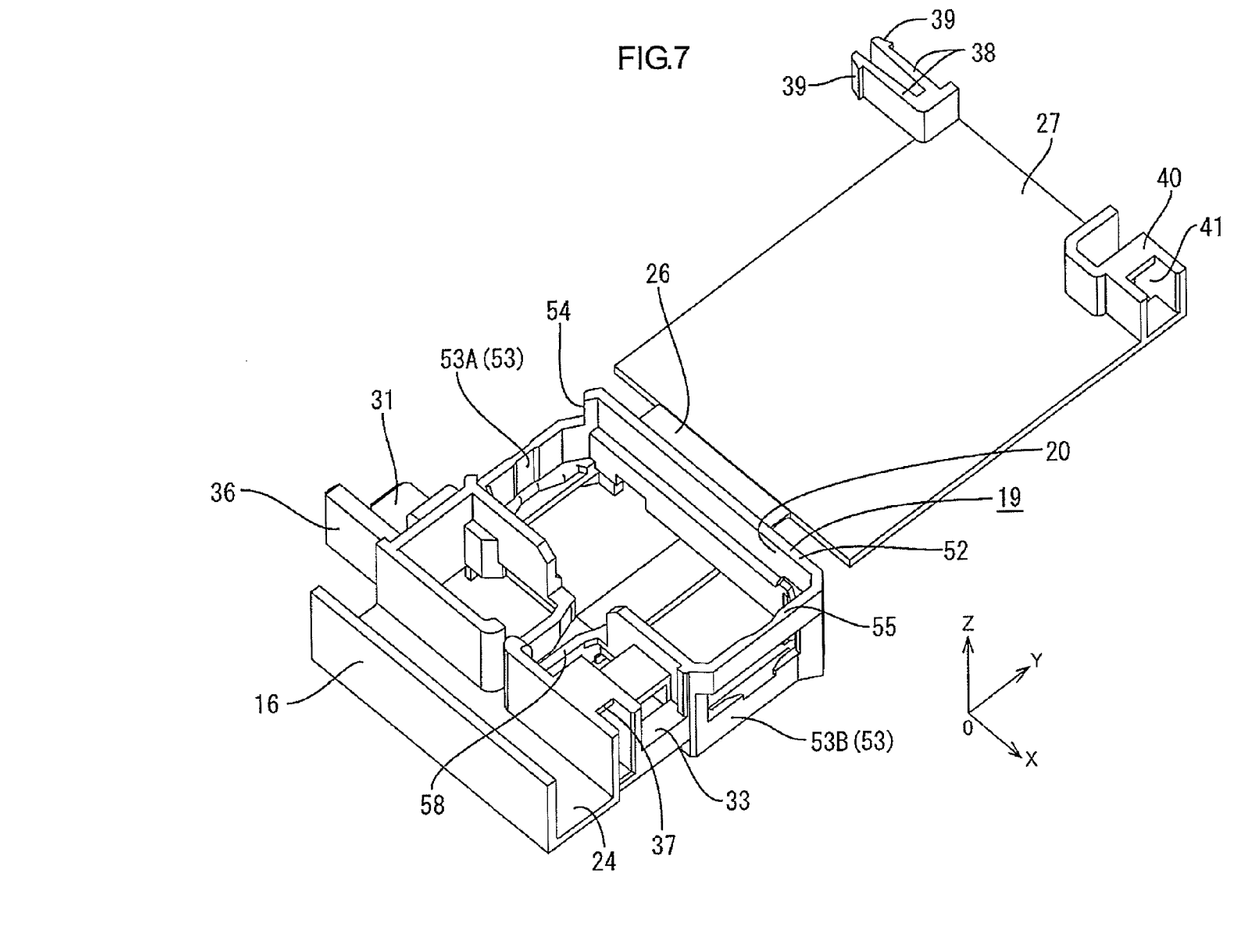
FIG. 7 is a perspective view of a connection unit.

As illustrated in FIG. 7, the pair of the side walls 53 includes a first side wall 53A (one of side walls) that is located on the right side in the FIG. 7 and a second side wall 53B (another one of the side walls) that is located on the right side in the FIG. 7.

Figure 10:
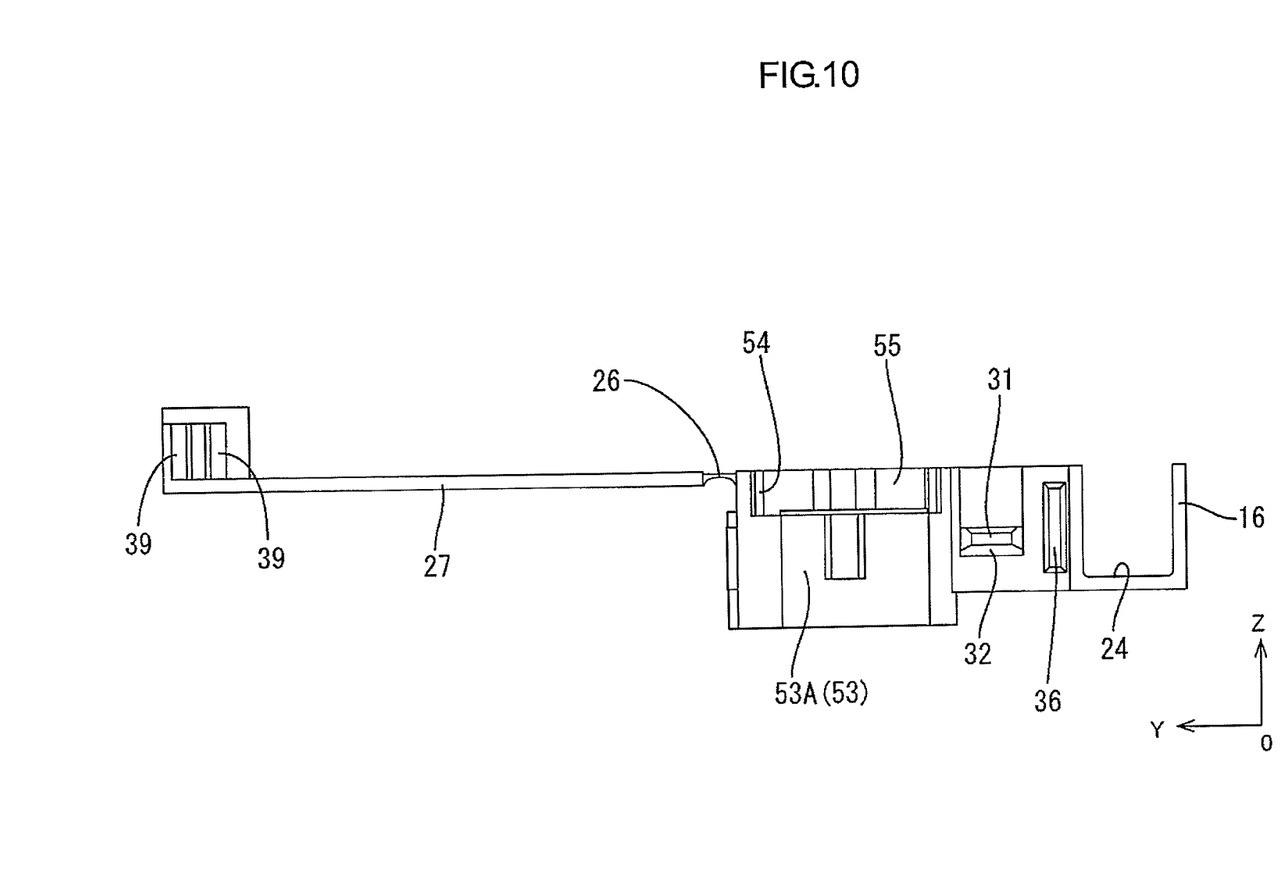
FIG. 10 is a left side view of the connection unit.

As illustrated in FIGS. 7 and 10, the first side wall 53A has a cutout 54 formed by cutting away an upper end portion thereof. As illustrated in FIG. 10, the cutout 54 is formed in a substantially elongated rectangular shape in the front-rear direction (a direction indicated by an arrow OY in FIG. 10). The cutout 54 is formed over a substantially entire area of the upper end portion of the first side wall 53A in the front-rear direction.

Figure 4:
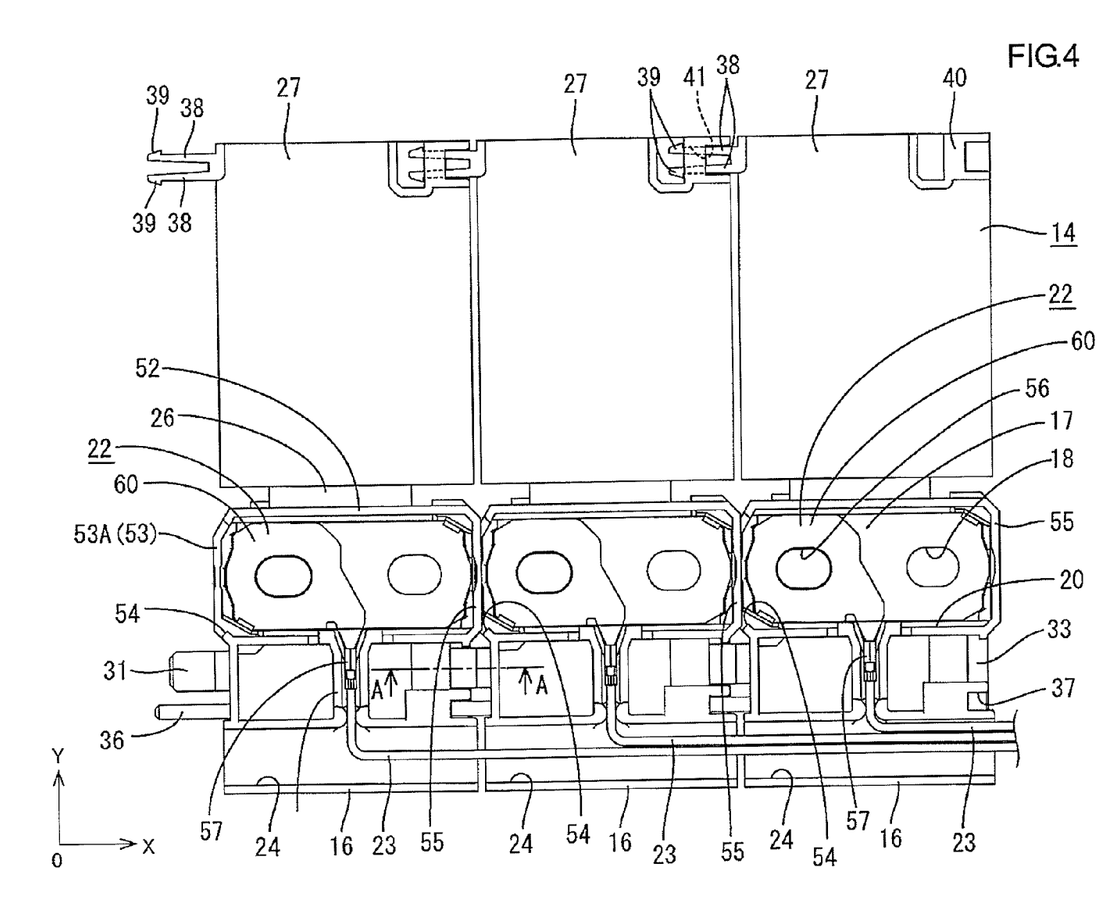
FIG. 4 is a magnified plan view illustrating a part of the battery wiring module.
Figure 9:
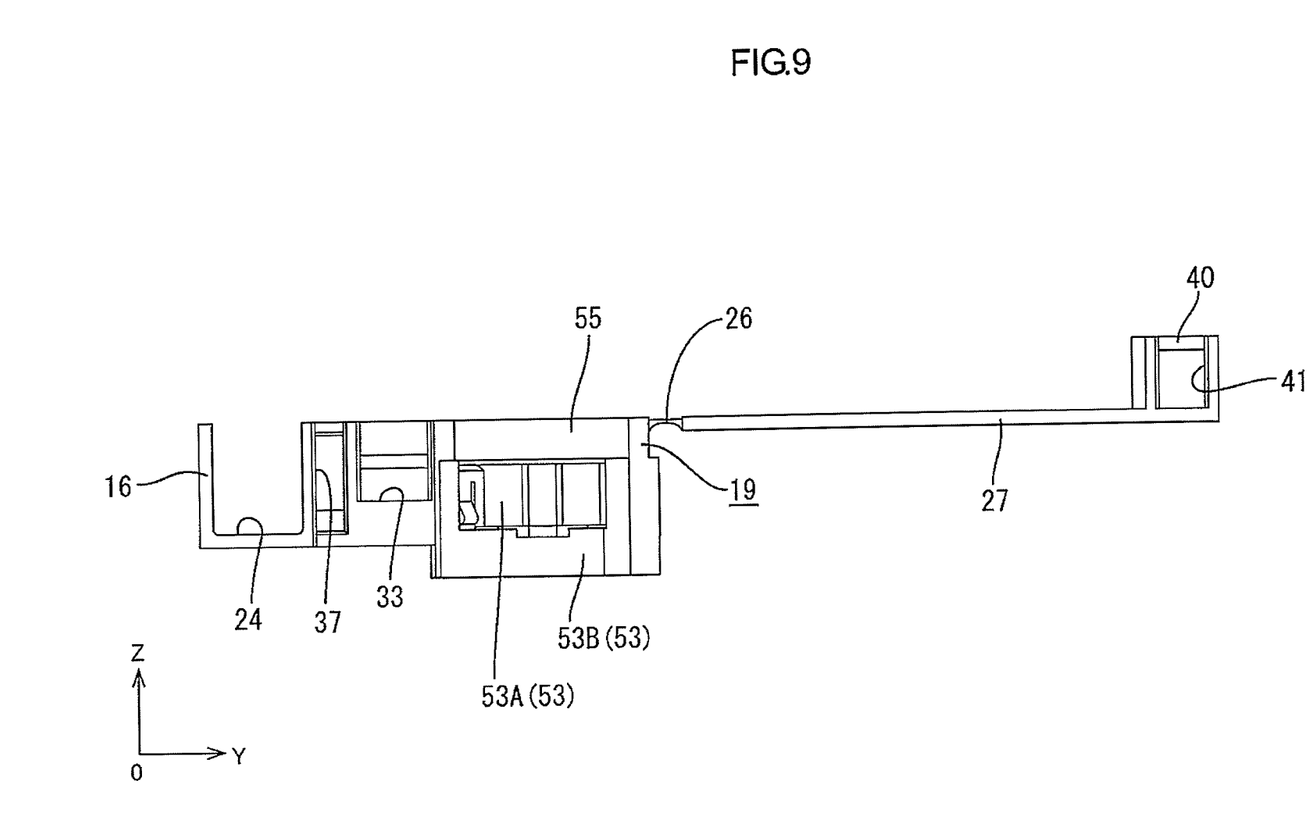
FIG. 9 is a right side view of the connection unit.

As illustrated in FIGS. 7 and 9, a fitting portion 55 is formed on an upper end portion of the second side wall 53B. As illustrated in FIG. 4, when the connection units 16 are connected to each other, the cutout 54 of one connection unit 16 is fitted to the fitting portion 55 of the other connection unit 16 adjacent to the one connection unit 16.

As illustrated in FIG. 4, if the connection units 16 are connected together, the first side wall 53A and the fitting portion 55 are placed on one top of another in the upper-lower direction. In other words, the first side wall 53A and the fitting portion 55 fitted to the cutout 54 of the first side wall 53A configure one insulation wall 52 having a thickness of the single insulation wall 52.

A voltage detection terminal 22 is housed in the bus bar housing 19. The voltage detection terminal 22 is connected to the electrode terminal 11 to detect a voltage of the electrode terminal 11. The voltage detection terminal 22 has a plate-like connecting portion 60 and a barrel portion 57 extending from the connecting portion 60 in an offset manner.

The connecting portion 60 has a terminal through hole 56 through which the electrode post 51 of the electrode terminal 11 is passed. In one of the adjacent electrode terminals 11 that are connected by the bus bar 17, the voltage detection terminal 22 is sandwiched by the nut 21 and the bus bar 17, and thus the voltage detection terminal 22 is electrically connected to the electrode terminal 11. In the present embodiment, the electrode post 51 on the left side in FIG. 2 is passed through the terminal through hole 56 of the voltage detection terminal 22.

The barrel portion 57 of the voltage detection terminal 22 is crimped on one end portion of a voltage detection line 23 and the other end of the voltage detection line 23 is connected to an ECU, which is not illustrated. The barrel portion 57 extends from a right end of the connecting portion 60 toward the right side and then extends to the front side. The connecting portion 60 and barrel portion 57 are formed substantially on the same plane. The "substantially on the same plane" herein includes both cases in which the connecting portion 60 and the barrel portion 57 are formed on the same plane and in which the connecting portion 60 and the barrel portion 57 are substantially on the same plane even if the connecting portion 60 and the barrel portion 57 are not formed on the same plane.

Figure 8:
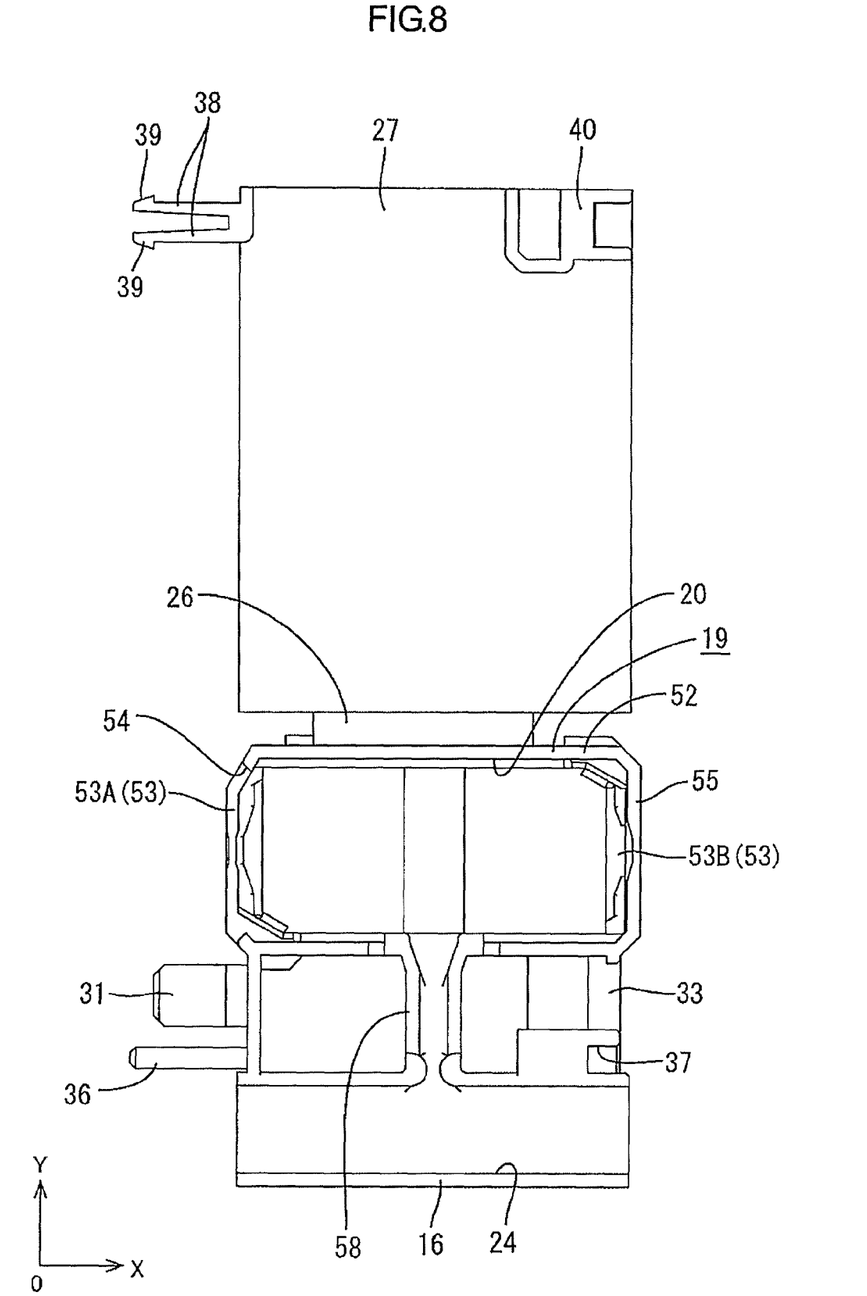
FIG. 8 is a plan view of the connection unit.

As illustrated in FIG. 4, the bus bar housing 19 has a barrel portion housing 58. The barrel portion housing 58 is located in a substantially middle area of the bus bar housing 19 in a longitudinal direction and extends to the front side (lower side in FIG. 4). The barrel portion housing 58 guides the barrel portion 57 to extend to the outside of the bus bar housing 19 (the front direction in the present embodiment). As illustrated in FIG. 8, the barrel portion housing 58 is formed in a groove-like shape that is open upwardly.

The connection unit 16 has a wire arrangement portion 24 made of synthetic resin in which the voltage detection line 23 is arranged in the right-left direction. The wire arrangement portion 24 is communicated with the bus bar housing 19 via a barrel portion 57 housing recess. The wire arrangement portion 24 is formed in a recess viewed from a right or left side so as to house the voltage detection lines 23.

As illustrated in FIGS. 8 and 9, a cover 27 made of synthetic resin is formed integrally with the bus bar housing 19 via a hinge 26. The cover 27 is provided on a rear surface of the bus bar housing 19. The cover 27 is movable around the hinge 26. The cover 27 is formed in substantially a rectangular shape viewed from the above and has a size that can cover the bus bar housing 19, the barrel portion housing 58, and the wire arrangement portion 24. A cover lock (not illustrated) formed on the cover 27 is elastically fitted to a cover lock receiver (not illustrated) formed on the wire arrangement portion 24. Thereby, the cover 27 is maintained in a state of covering the bus bar housing 19, the barrel portion housing 58, and the wire arrangement portion 24.

(Joint Structure of Connection Units 16)

Figure 5:
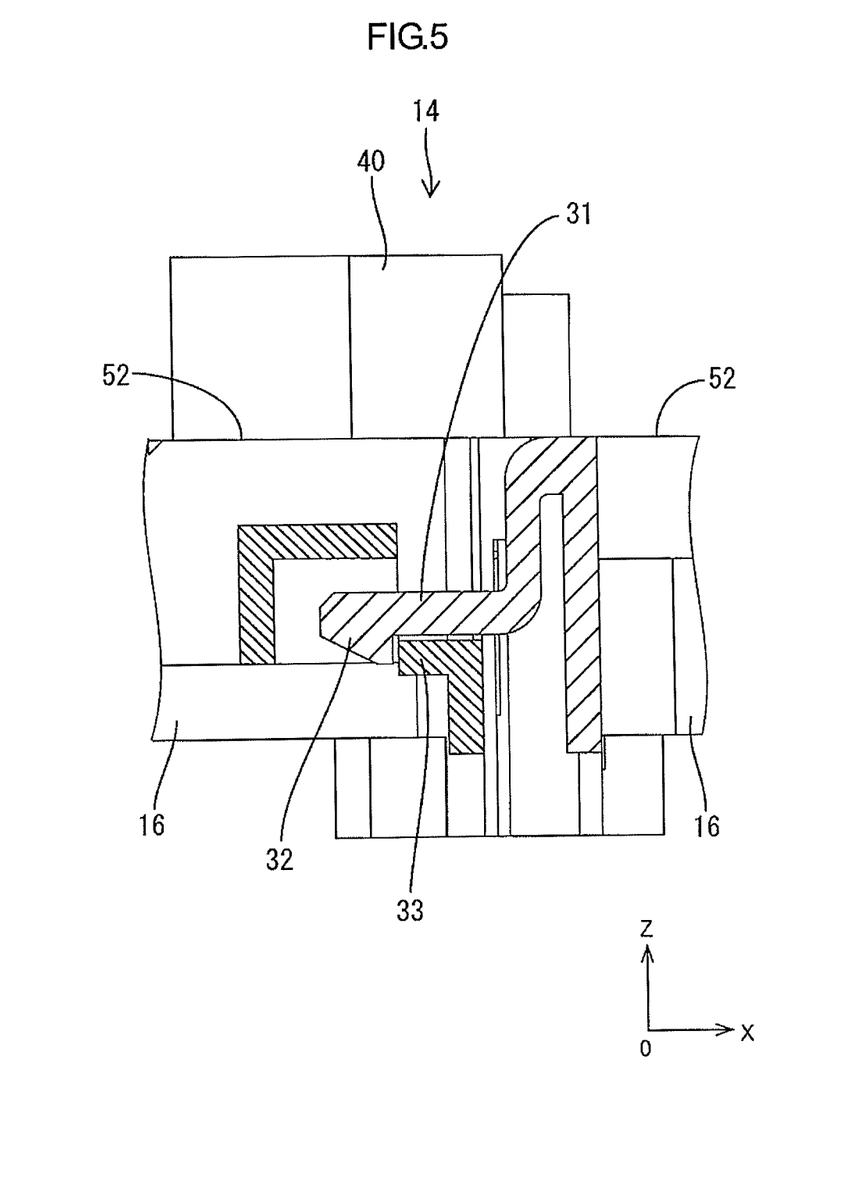
FIG. 5 is a cross-sectional view taken along a line A-A in FIG. 4.
Figure 6:
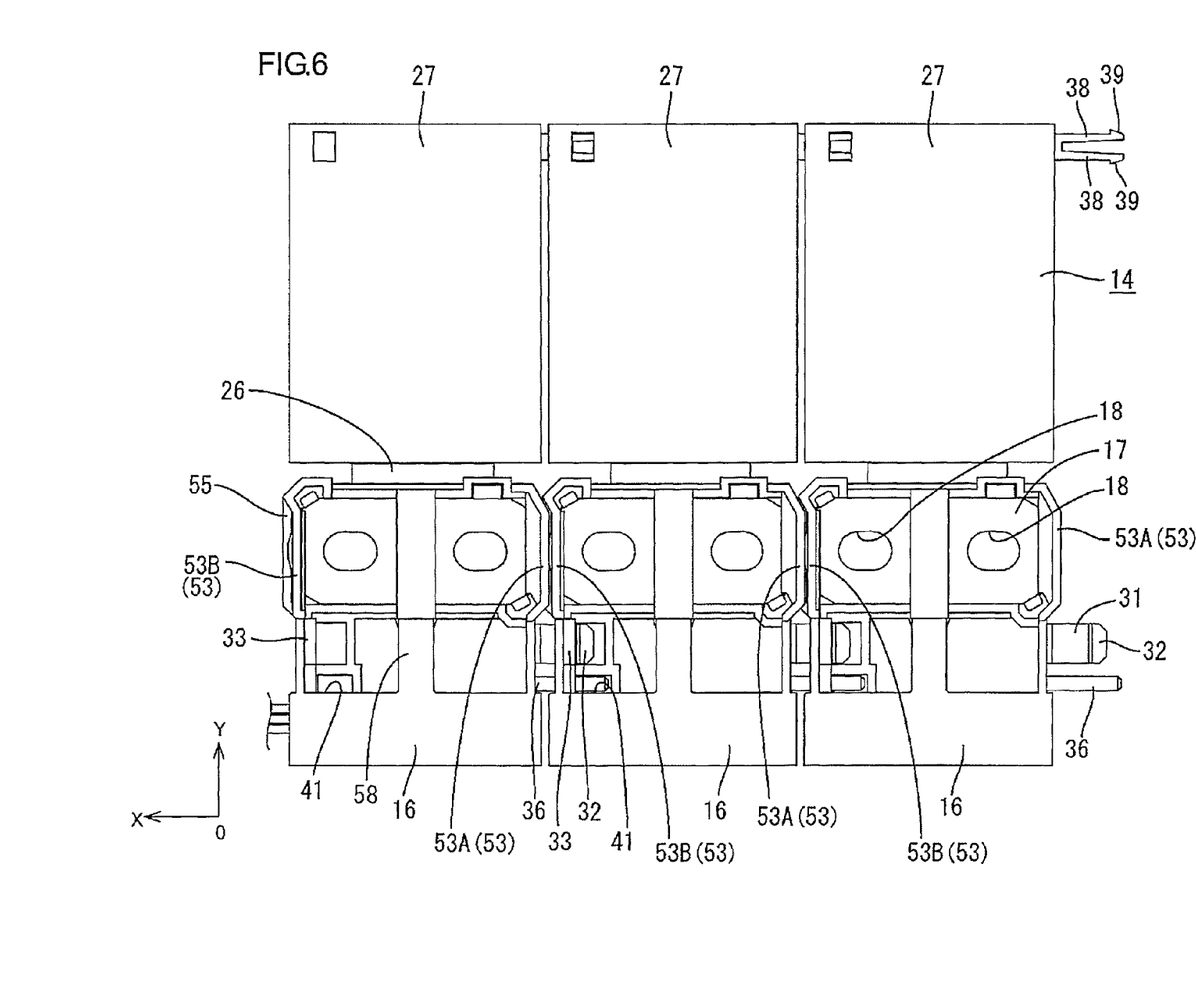
FIG. 6 is a magnified bottom view illustrating a part of the battery wiring module.

As illustrated in FIG. 4, a unit stopper (a stopper) 31 is formed on a left side end of the connection unit 16 so as to project toward the left side. As illustrated in FIG. 5, a unit stopper projection 32 is formed at a distal end of the unit stopper 31 so as to project downwardly.

As illustrated in FIGS. 7 and 9, a unit stopper receiver (a stopper receiver) 33 is formed on a right side end of the connection unit 16. The unit stopper receiver 33 receives the unit stopper 31. The unit stopper 31 is elastically fitted to the unit stopper receiver 33 and thereby the connection units 16 are connected to each other.

As illustrated in FIG. 5, the unit stopper projection 32 of the unit stopper 31 is in contact with the unit stopper receiver 33 from a left side of the unit stopper receiver 33 and thereby the connection units 16 are connected together in the right-left direction.

As illustrated in FIG. 4, a guide 36 is formed on a left side edge of the connection unit 16. The guide 36 is arranged adjacent to the unit stopper 31 in the front-rear direction and projects toward the left side. As illustrated in FIGS. 8 and 10, the guide 36 is formed in a flat plate shape in the front-rear direction.

As illustrated in FIGS. 8 and 9, a guide receiver 37 is formed on a right side edge of the connection unit 16. The guide 36 is fitted to the guide receiver 37. The guide receiver 37 is a through hole through which the guide 36 is passed in the right-left direction.

(Connecting Structure of Cover 27)

As illustrated in FIG. 4, a cover stopper (the stopper) 38 is formed on a left side end of the cover 27 and projects toward the left side. The cover stopper 38 is branched into two parts and a cover projection 39 is formed at each distal end of the two branched distal ends.

As illustrated in FIGS. 8 and 9, a cover stopper receiver (the stopper receiver) 40 is formed on the right side end of the connection unit 16. The cover stopper 38 is fitted to the cover stopper receiver 40. A cover stopper hole 41 is formed through the cover stopper receiver 40 in the right-left direction and the cover stopper projection 39 passes through the cover stopper hole 41.

As illustrated in FIG. 4, the cover stopper projection 39 is fitted through the cover stopper hole 41 and in contact with an opening edge of the cover stopper hole 41 from a left side. Thereby, the covers 27 are connected to each other in the right-left direction.

As illustrated in FIG. 4, with the configuration in which the cover stopper 38 is fitted to the cover stopper receiver 40 and the configuration in which the unit stopper 31 is fitted to the unit stopper receiver 33, the connection units 16 are connected to each other in the right-left direction to configure the battery wiring module 14.

As illustrated in FIG. 2, the barrel portion 57 is arranged between the adjacent electrode terminals 11. As mentioned above, the barrel portion 57 is housed in the barrel portion housing 58. The barrel portion housing 58 is formed to extend from a substantially middle portion of the bus bar housing 19 in the arrangement direction of the batteries 12 to the outside of the bus bar housing 19. In FIG. 2, the barrel portion housing 58 extends from the bus bar housing 19 to the front side.

Figure 11:
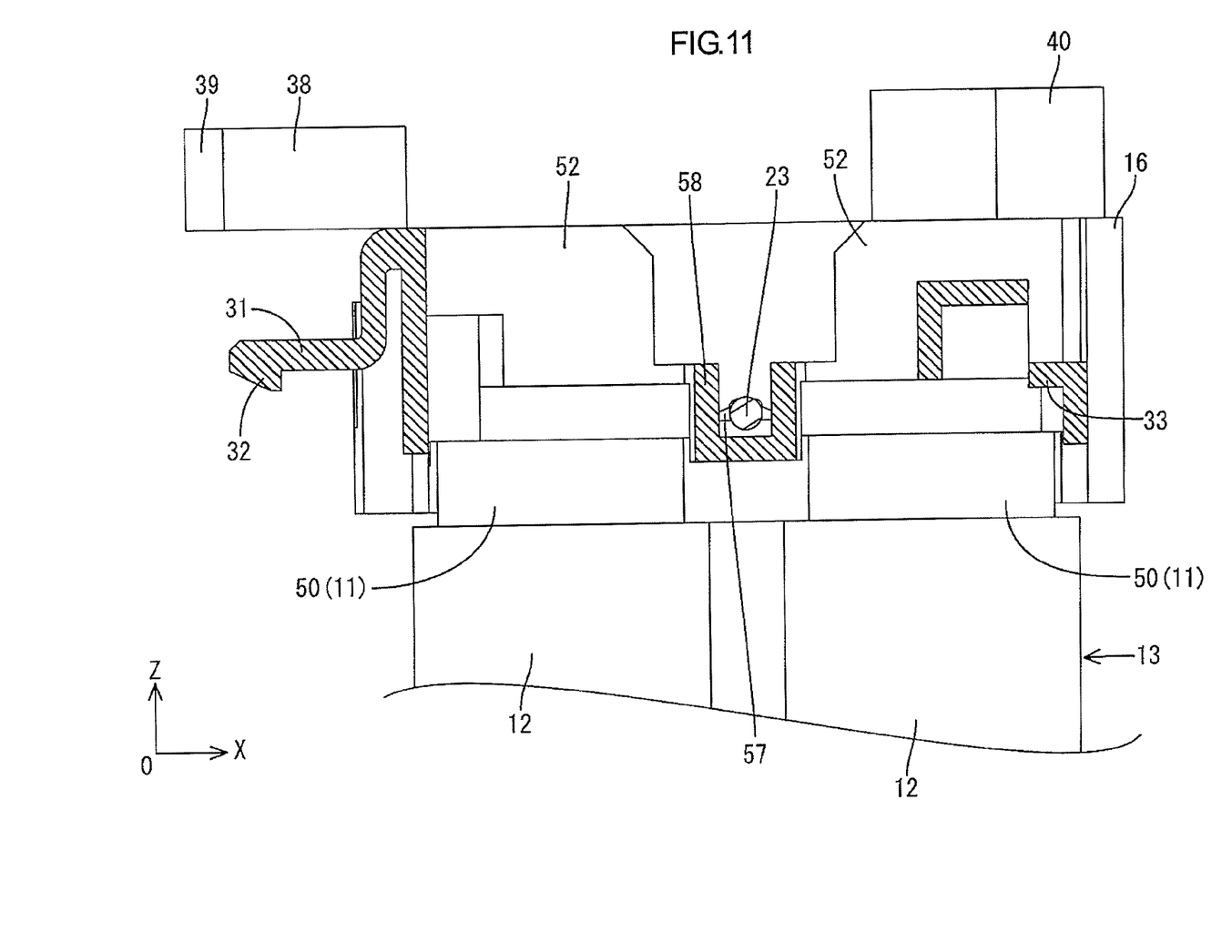
FIG. 11 is a partially magnified cross-sectional view taken along a line B-B in FIG. 2.

As illustrated in FIG. 11, the barrel portion housing 58 is arranged between the terminal bases 50 of the adjacent batteries 12. A bottom end portion of the barrel portion housing 58 is located lower than an upper end of the terminal base 50. The barrel portion housing 58 houses the barrel portion 57 of the voltage detection terminal 22. In FIG. 11, some connection units 16 that are unnecessary for explanation are not described.

(Assembling Method and Attaching Method)

Next, a method of assembling the battery wiring module 14 and a method of attaching the battery wiring module 14 to the battery group 13 will be explained. First, the connection units 16 are prepared. The unit stopper 31 of one connection unit 16 is fitted to the unit stopper receiver 33 of another connection unit 16 in the right-left direction, and the cover stopper 38 of the one connection unit 16 is fitted to the cover stopper receiver 40 of the other connection unit 16 in the right-left direction. Accordingly, the connection units 16 are connected to each other in the right-left direction. Then, the bus bar 17 is arranged in the bus bar housing 19 of each of the connection units 16.

Next, the voltage detection terminal 22 is crimped on one end of the voltage detection line 23 to connect the voltage detection line 23 and the voltage detection terminal 22. The voltage detection lines 23 are arranged in the wire arrangement portions 24 of the connected connection units 16. Each voltage detection terminal 22 is arranged in each bus bar housing 19. Accordingly, the battery wiring module 14 is assembled as illustrated in FIG. 4.

Next, the plurality of batteries 12 are arranged such that the surfaces having the electrode terminals 11 face upwardly. Twelve batteries 12 are arranged in the right-left direction such that the electrode terminals 11 of each battery 12 are arranged in the front-rear direction. The battery wiring module 14 is attached to the electrode terminals 11 of the battery group 13 from the above. The electrode terminals 11 are fitted through the terminal through holes 18 of the bus bar 17.

Then, the nut 21 is screwed to each of the electrode terminals 11. Accordingly, the batteries 12 are connected in series.

Next, the connected covers 27 are moved around the hinges 26 and closed to cover the bus bar housings 19, the barrel portion housings 58, and the wire arrangement portions 24. The cover locks and the cover lock receivers are elastically fitted to each other and this keeps the covers 27 in the closed state. Accordingly, the battery module 10 is completed.

(Operations and Advantageous Effects of the Present Embodiment)

Operations and advantageous effects of the present embodiment will be explained. According to the present embodiment, the plurality of connection units 16 that are connected to each other configure the battery wiring module 14. Therefore, the battery wiring module 14 can bend at each connection between the connection units 16 and this allows the battery wiring module 14 to be curved as a whole. Accordingly, in assembling the battery wiring module 14 to the battery group 13, the battery wiring module 14 is curved as a whole and each bus bar 17 housed in each connection unit 16 can be connected to the electrode terminals 11 for every connection unit 16. This improves assembling efficiency of assembling the battery module 14 to the battery group 13.

Each terminal through hole 18 formed in the bus bar 17 is formed in an elongated shape in the arrangement direction of the batteries 12. Therefore, the terminal through holes 18 can absorb the deviation of the pitch between the electrode terminals 11.

In the battery group 13 in which the plurality of batteries 12 are arranged, a manufacturing tolerance of the electrode terminal 11 and an assembly tolerance between the arranged batteries 12 are accumulated for every additional battery 12. Accordingly, the deviations of the pitch between the electrode terminals 11 on both ends of the battery group 13 are relatively great. If the pair of the terminal through holes 18 in the bus bar 17 is designed to absorb such a deviation of the pitch with an elongated shape, the terminal through holes 18 are required to have a relatively elongated shape. As a result, the bus bar 17 is also required to have a relatively elongated shape in the arrangement direction.

The above bus bar 17 is housed in the bus bar housing 19 of the connection unit 16. Since a relatively high current flows through the bus bar 17, the bus bar 17 may be insulated by the insulation walls 52 of the bus bar housing 19. If the insulation walls 52 are formed for the bus bar housing 19 of each connection unit 16 so as to surround the relatively elongated bus bar 17, each connection unit 16 may increase its size in the arrangement direction of batteries 12. This may result in increasing a size of the battery wiring module 14 that is configured by connecting the connection units 16.

In the present embodiment, among the connection units 16, one connection unit 16 has the cutout 54 formed in the first side wall 53A and another connection unit 16 adjacent to the one connection unit 16 has the fitting portion 55 formed in the second side wall 53B. The fitting portion 55 is fitted inside the cutout 54. Thus, the fitting portion 55 formed in the second side wall 53B of the other connection unit 16 that is located adjacent to the one connection unit 16 is fitted to the cutout 54 formed in the first side wall 53A of the one connection unit 16. Accordingly, the bus bar 17 is insulated. As a result, the first side wall 53A and the fitting portion 55 fitted to the cutout 54 formed in the first side wall 53A configure the insulation wall 52 having a thickness of the single insulation wall 52. As a result, the battery wiring module 14 is downsized in the arrangement direction of the batteries 12 compared to a case in which the insulation wall 52 is provided to each connection unit 16.

In the present embodiment, among the connection units 16, one connection unit 16 has the unit stopper 31 extending toward another connection unit 16 adjacent to the one connection unit 16. The unit stopper 31 is fitted to the unit stopper receiver 33 formed in the other connection unit 16. Thereby, the one connection unit 16 and the other connection unit 16 are connected to each other. Further, the one connecting unit 16 has the cover stopper 38 extending toward the other connection unit 16 adjacent to the one connection unit 16. The cover stopper 38 is fitted to the cover stopper receiver 40 formed in the other connection unit 16. Thereby, the cover 27 of the one connection unit 16 and the cover 27 of the other connection unit 16 are connected to each other. With such a configuration, the connection units 16 are connected to one another by fitting the unit stopper 31 to the unit stopper receiver 33 and fitting the cover stopper 38 to the cover stopper receiver 40. This improves workability of assembling the battery wiring module 14

According to the present embodiment, the barrel portion 57 of the voltage detection terminal 22 is arranged between the electrode terminal 11 of one battery 12 and the electrode terminal 11 of another battery adjacent to the one battery 12. Specifically, as illustrated in FIG. 11, the barrel portion 57 is arranged between the terminal bases 50 of the electrode terminals 11 that are adjacent to each other. With such a configuration, the voltage detection terminal 22 is not required to be processed to have a complex shape so as not to cause the barrel portion 57 to interfere with the terminal base 50 of the electrode terminal 11 or components of the battery 12. This reduces the number of steps of managing the shape of the voltage detection terminal 22 and the manufacturing cost is reduced.

According to the present embodiment, the barrel portion 57 extends outwardly from a substantially middle portion of the bus bar housing 19 in the battery arrangement direction of the batteries 12. With this configuration, the barrel portion 57 does not interfere with the terminal base 50 of the electrode terminal 11 or components of the battery 12. This further simplifies the shape of the voltage detection terminal 22. As a result, the number of steps of managing the shape of the voltage detection terminal 22 decreases and the manufacturing is reduced.

Further, according to the present embodiment, the voltage detection terminal 22 has the connecting portion 60 configured to be connected to the electrode terminal 11. The connecting portion 60 and the barrel portion 57 are formed on substantially a same plane. With such a configuration, a step is not required to be formed between the connecting portion 60 of the voltage detection terminal 22 and the barrel portion 57 and accordingly the steps of managing the shape of the step are not required. As a result, the cost for manufacturing the voltage detection terminal 22 is further reduced.

<Other Embodiments>

The present invention is not limited to the aspects explained in the above description made with reference to the drawings. The following aspects may be included in the technical scope of the present invention, for example.

(1) In the present embodiment, the first side wall 53A has the cutout 54 and the second side wall 53B has the fitting portion 55. However, the insulation walls 52 may not include the cutout 54 or the fitting portion 55.

(2) In the above embodiment, the barrel portion 57 of the voltage detection terminal 22 extends outwardly from the substantially middle portion of the bus bar housing 19. However, the barrel portion 57 may extend outwardly from a portion of the bus bar housing 19 close to an end thereof.

(3) The battery 12 of the present embodiment includes a pair of the electrode terminals 11 on its upper surface. However, one electrode terminal 11 may be formed on the upper surface of the battery 12 and the other electrode terminal 11 may be formed on a lower surface of the battery 12.

(4) In the present embodiment, the batteries 12 are connected in series. However, the batteries 12 may be connected in parallel to each other.

(5) The number of connection units 16 included in the battery wiring module 14 is not limited to the configuration described in the present embodiment. The desired number of the connection units 16 may be necessarily connected to each other to configure the battery wiring module 14.

(6) In the present embodiment, the electrode terminal 11 includes the terminal base 50 and the electrode post 51, and the nut 21 is screwed to the electrode post 51 such that the electrode terminal 11 and bus bar 17 are connected to each other with having the bus bar 17 between the terminal base 50 and the nut 21. However, the terminal base 50 of the electrode terminal 11 may have a thread hole and a bolt may be screwed to the thread hole such that the electrode terminal 11 and the bus bar 17 are connected to each other with having the bus bar 17 between the terminal base 50 and a top head of the bolt.

A battery wiring module according to the technique described in the specification is configured to be attached to a battery group including a plurality of batteries each having electrode terminals including a positive electrode terminal and a negative electrode terminal and configured to connect the electrode terminals. The battery wiring module includes a plurality of connection units connected to each other in a battery arrangement direction in which the batteries are arranged. Each of the connection units includes a bus bar and a bus bar housing. The bus bar is configured to connect one of the electrode terminals of one of the batteries and one of the electrode terminals of another one of the batteries. The bus bar housing is configured to house the bus bar. The bus bar has a pair of terminal through holes through which the electrode terminals are inserted and each of the terminal through holes is formed in a shape so as to elongate in the battery arrangement direction.

According to the technique described in the specification, the battery wiring module includes the plurality of connection units. With this configuration, the electric wiring module is more likely to be curved as a whole and thus each bus bar housed in each connection unit can be connected to each electrode terminal by bending the battery wiring module as a whole. This improves workability of assembling the battery wiring module to the batteries.

Each of the pair of the terminal through holes formed in the bus bar has an elongated shape in the battery arrangement direction. Therefore, the deviation of the pitch between the electrode terminals can be absorbed by the terminal through holes.

The technique described in the specification may be configured as follows.

The bus bar housing of the connection unit may have a plurality of insulation walls surrounding an edge portion of the bus bar. A pair of the insulation walls that are perpendicular to the battery arrangement direction may be a pair of side walls. One of the connection units may have a cutout formed by cutting away a part of one of the side walls. Another one of the connection units adjacent to the one of the connection units may have a fitting portion formed in another one of the side walls. The fitting portion may be fitted to the cutout in the one of the connection units.

In the battery group in which the plurality of batteries are arranged, a manufacturing tolerance of the electrode terminal and an assembling tolerance between the arranged batteries are accumulated for every additional battery. Accordingly, the deviation of the pitch between the electrode terminals on both ends of the battery group is relatively great. If the pair of the terminal through holes in the bus bar is designed to absorb such a deviation of the pitch with an elongated shape, the terminal through holes are required to have a relatively elongated shape. As a result, the bus bar is also required to have a relatively elongated shape in the battery arrangement direction.

The above bus bar is housed in the bus bar housing of the connection unit. Since a relatively high current flows through the bus bar, the bus bar may be insulated by the insulation walls of the bus bar housing. If the insulation walls are formed for the bus bar housing of each connection unit so as to surround the relatively elongated bus bar, each connection unit may increase its size in the battery arrangement direction. This may also increase the size of the battery wiring module that is configured with the connected connection units.

In the present invention, the pair in the insulation walls that are perpendicular to the battery arrangement direction is defined as a pair of side walls. One of the connection units has a cutout formed by cutting away a part of one of the side walls. Another one of the connection units adjacent to the one of the connection units has a fitting portion formed in another one of the side walls. The fitting portion is fitted to the cutout in the one of the connection units. The fitting portion is fitted inside the cutout. Thus, the fitting portion formed in the other one of the side walls of the other one of the connection units that is located adjacent to the one of the connection unit is fitted to the cutout formed in the one of the side walls of the one of the connection units. Accordingly, the bus bar is insulated. As a result, the battery wiring module is downsized in the battery arrangement direction compared to a case in which the insulation walls are provided to each connection unit.

The one of the connection units may have a stopper extending toward the other one of the connection units adjacent to the one of the connection units. The stopper may be fitted to a stopper receiver formed in the other one of the connection units such that the one of the connection units and the other one of the connection units are connected to each other.

With this configuration in which the stopper is fitted to the stopper receiver, the connection units are connected to each other. This improves workability of assembling the battery wiring module.

A voltage detection terminal may be arranged in the bus bar housing. The voltage detection terminal may be configured to be connected to the electrode terminal and to detect a voltage of the electrode terminal. The voltage detection terminal may have a barrel portion configured to be connected to an end of a voltage detection line. The barrel portion may be arranged between the electrode terminal of the one of the batteries and the electrode terminal of the other one of the batteries in the battery arrangement direction.

In this configuration, the barrel portion of the voltage detection terminal is located between the one of the electrode terminals of the one of the batteries and the one of the electrode terminals of the other one of batteries. Therefore, the voltage detection terminal is not required to be processed to have a complex shape so as not to cause the barrel portion to interfere with a terminal base of the electrode terminal or components of the battery. This reduces the number of steps of managing the shape of the voltage detection terminal and therefore the manufacturing cost is reduced.

The barrel portion may extend to an outer side of the bus bar housing from a substantially middle area of the bus bar housing in the battery arrangement direction.

The barrel portion may extend to an outer side of the bus bar housing from a substantially middle area of the bus bar housing in the battery arrangement direction.

With this configuration, the electrode terminals does not interfere with the barrel portion. This simplifies the shape the voltage detection terminal. As a result, the number of steps of managing the shape of the voltage detection terminal decreases and the manufacturing cost is reduced.

The voltage detection terminal may include a connecting portion configured to be connected to the electrode terminal. The connecting portion and the barrel portion are formed on a same plane.

With the configuration in which the connecting portion and the barrel portion of the voltage detection terminal are formed on a same plane, a step is not required between the connecting portion and the barrel portion of the voltage detection terminal. Therefore, the number of steps of managing the step is not required. As a result, the cost for manufacturing the voltage detection terminal can be reduced.

EXPLANATION OF SYMBOLS

11: Electrode terminal
12: Battery
13: Battery group
14: Battery wiring module
16: Connection unit
17: Bus bar
18: Terminal through hole
19: Bus bar housing
22: Voltage detection terminal
23: Voltage detection line
31: Unit stopper (stopper)
33: Unit stopper receiver (stopper receiver)
38: Cover stopper (stopper)
40: Cover stopper receiver (stopper receiver)
52: Insulation wall
53A: First side wall (one side wall)
53B: Second side wall (another side wall)
54: Cutout
55: Fitting portion
57: Barrel portion
60: Connecting portion

The invention claimed is:

1. A battery wiring module configured to be attached to a battery group including a plurality of batteries each having electrode terminals including a positive terminal and a negative terminal and to connect the electrode terminals, the battery wiring module comprising:
   a plurality of connection units connected to each other in a battery arrangement direction in which a plurality of batteries are arranged, each of the connection units includes a bus bar housing; and
   a bus bar housed in the bus bar housing and configured to connect one of the electrode terminals of one of the batteries and one of the electrode terminals of another one of the batteries and the bus bar has a pair of terminal through holes through which the electrode terminals are inserted and each of the terminal through holes is formed in a shape so as to elongate in the battery arrangement direction,
   wherein the bus bar housing of the connection unit has a plurality of insulation walls surrounding an edge portion of the bus bar, a pair of the insulation walls that are perpendicular to the battery arrangement direction are a pair of side walls,
   one of the connection units has a cutout formed by cutting away a part of one of the side walls, and
   another one of the connection units adjacent to the one of the connection units has a fitting portion formed in another one of the side walls, the fitting portion being fitted to the cutout in the one of the connection units.

2. The battery wiring module according to claim 1, wherein
   the one of the connection units has a stopper extending toward the other one of the connection units adjacent to the one of the connection units, and
   the stopper is fitted to a stopper receiver formed in the other one of the connection units such that the one of the connection units and the other one of the connection units are connected to each other.

3. The battery wiring module according to claim 1, wherein
   a voltage detection terminal is arranged in the bus bar housing, the voltage detection terminal being configured to be connected to the electrode terminal and detect a voltage of the electrode terminal, and
   the voltage detection terminal has a barrel portion configured to be connected to an end of a voltage detection line, and the barrel portion is arranged between the electrode terminal of the one of the batteries and the electrode terminal of the other one of the batteries in the battery arrangement direction.

4. The battery wiring module according to claim 3, wherein the barrel portion extends to an outer side of the bus bar housing from a substantially middle portion of the bus bar housing in the battery arrangement direction.

5. The battery wiring module according to claim 3, wherein the voltage detection terminal has a connecting portion configured to be connected to the electrode terminal, and the connecting portion and the barrel portion are formed on a same plane.

* * * * *